Dec. 6, 1927.

G. A. CAMPBELL 1,651,440

ELECTRICAL TESTING APPARATUS

Filed Jan. 4, 1922

2 Sheets-Sheet 1

INVENTOR
G. A. Campbell
BY
ATTORNEY

Dec. 6, 1927.  1,651,440
G. A. CAMPBELL
ELECTRICAL TESTING APPARATUS
Filed Jan. 4, 1922    2 Sheets-Sheet 2

INVENTOR
G. A. Campbell
BY
ATTORNEY

Patented Dec. 6, 1927.

1,651,440

UNITED STATES PATENT OFFICE.

GEORGE A. CAMPBELL, OF UPPER MONTCLAIR, NEW JERSEY, ASSIGNOR TO AMERICAN TELEPHONE AND TELEGRAPH COMPANY, A CORPORATION OF NEW YORK.

ELECTRICAL TESTING APPARATUS.

Application filed January 4, 1922. Serial No. 526,887.

This invention relates to electrical measuring apparatus, and particularly to a Wheatstone bridge network adapted to measure not only the difference in direct capacity but also the direct conductance difference and the direct admittance difference of any two conductors in a system of conductors to a third conductor or group of conductors or ground.

In the installation of duplex cables, it is customary to measure the capacity unbalance existing between each two pairs of wires upon which a phantom circuit is superposed and also between each of two such pairs of wires and the superposed phantom circuit. Such measurements may be made by the means and method disclosed in the patent to Blackwell and Anderegg, No. 1,064,433, dated June 10, 1913, and that to Campbell, Blackwell and Colpitts, No. 1,167,677, dated January 11, 1916. The measurement of capacity unbalance may be more readily made than the measurement of direct capacity or direct capacity difference, and furthermore, the capacity unbalance measurement is satisfactory in the balanced splicing of duplex cables.

In the development work accurate measurements are more important than in commercial work, and consequently it is sometimes desirable to measure the differences in capacity separately rather than the capacity unbalance as disclosed in the said patents. This is especially true in development work on open wire. It should be noted that the capacity unbalance referred to above is the sum of two or more of these direct capacity differences. The direct capacity difference is also of particular interest in studying inductive interference from power or telegraph circuits into cable telephone circuits, since the induced noise depends somewhat upon the direct capacity difference between the two sides of a circuit and the sheath.

It is the object of this invention to provide a simple Wheatstone bridge network adapted to measure rapidly not only the direct capacity differences but also direct conductance differences between two conductors and a third conductor or group of conductors or ground.

Figure 1:
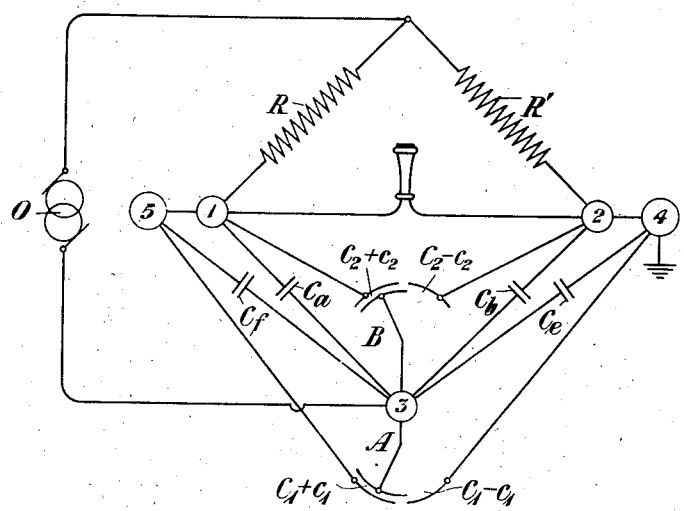
Figure 2:
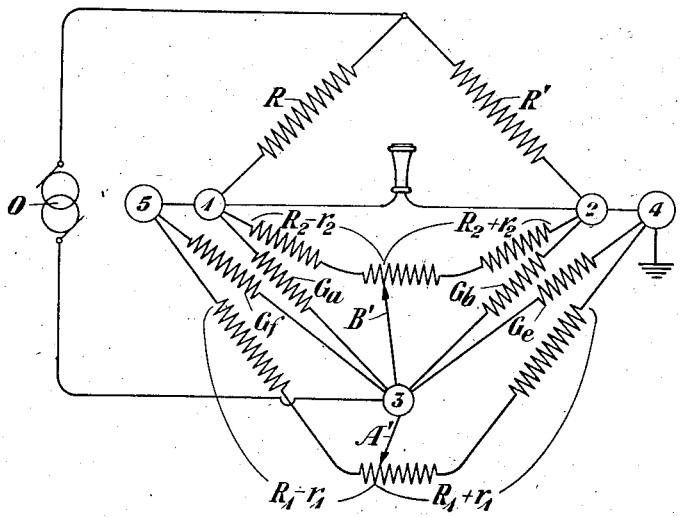
Figure 3:
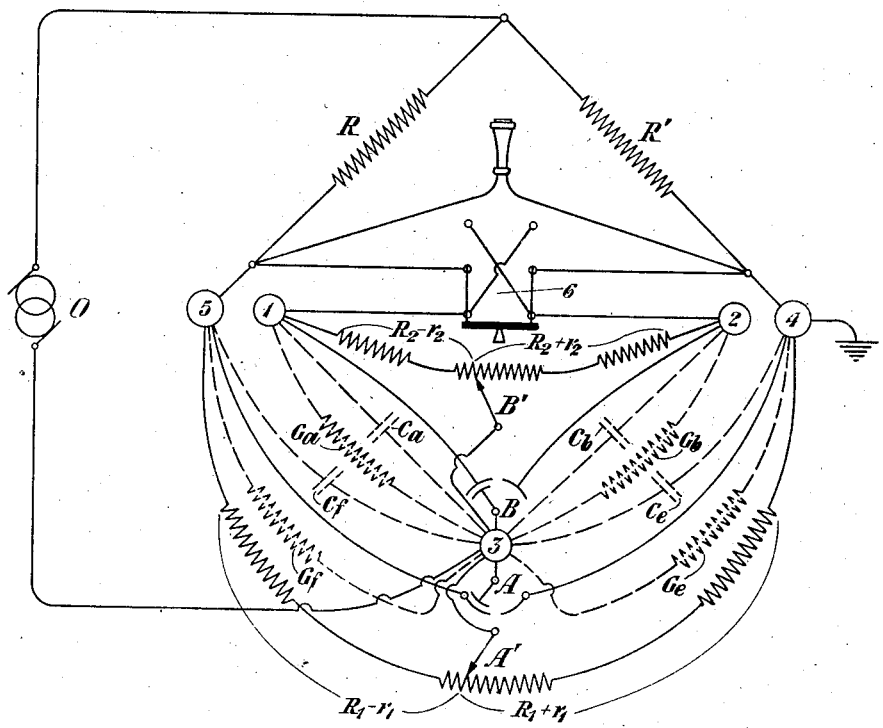

This invention will be better understood from the following description, when read in connection with the attached drawing, of which Figure 1 shows a network adapted for the measurement of direct difference of capacity of two conductors and a third conductor or group of conductors, and Fig. 2 shows a network for measuring conductance difference of the same conductor arrangement, the latter network being designed to balance the circuit with respect to conductance variations in order that a sharper balance may be obtained in the making of the capacity difference measurements, and Fig. 3 shows the combination of the circuits shown in Figs. 1 and 2, which is the practical form in which these circuits are used.

In Fig. 1, 1 and 2 represent two conductors, the difference in capacity or conductance of which to a third conductor or group represented by 3, it is desired to measure.

Each of the circles 4 and 5 represents a group of conductors containing one-half of the other conductors in the system of which 1 and 2 form a part, the said groups being conductively connected with the conductors 2 and 1 respectively, of the pair whose capacity difference, for instance, is to be measured. The said other conductors of the system are divided into two approximately equal groups 4 and 5 so as to reduce the amount of capacity and conductance required in the bridge for obtaining a balance, and also, in certain cases, to reduce trouble from external interference. The groups 3, 4 and 5 remain unchanged throughout the two measurements required to obtain the desired difference. It should be noted that in measuring the direct differences between two conductors of a system and a third conductor one of the groups, as for example 4, is grounded. The direct capacity of conductor 1 to conductor 3 is represented by the condenser $C_a$ and similarly, the direct capacity of conductor 2 to conductor 3 is represented by the condenser $C_b$. The direct capacity to conductor 3 of the group of conductors 5 connected with conductor 1 is represented by the condenser $C_f$, and similarly, the direct capacity to conductor 3 of the group 4 connected to conductor 2 is represented by condenser $C_e$. Two adjustable condensers are connected between conductor 3 and the said conductors of the system. Thus condenser A has one set of fixed plates connected with the group of conductors 5 and the other set of fixed plates connected with the group conductors 4. The movable plates of the said condenser are connected to conductor 3. In like manner in the adjustable condenser B, one set of fixed plates is connected to conductor 1 and the other set to conductor 2, and the movable plates of the said condenser are connected to conductor 3. Bridged across conductors 1 and 2 is a current indicating device such as a telephone receiver. Two accurately balanced ratio arms R and R', connected with conductors 1 and 2, respectively, complete the Wheatstone bridge network. Connected between the junction point of the arms R and R' and conductor 3, is a source of potential O.

In the conductance balancing network shown in Fig. 2, the same numerals have been used to represent the parts common to both the capacity and the conductance measuring networks. In Fig. 2, $G_a$ and $G_b$ represent, respectively, the direct conductance between conductor 1 and conductor 2 and conductor 3; and $G_f$ and $G_e$ represent the direct conductance to conductor 3 of the groups 5 and 4 respectively. Two variable resistances A' and B' complete the network. The variable resistance A' is inserted between each of the groups 5 and 4 and conductor 3, and the variable resistance B' between conductors 1 and 2 and conductor 3.

The network represented by Fig. 2 is most useful when measuring the direct capacity differences in open wire circuits where it is necessary to provide means for balancing the direct conductance differences between the conductors whose capacity difference is to be measured, in order to obtain silence in the telephone receiver when the direct capacity differences are balanced. In measurements on cable circuits, however, the conductance adjustments are usually unnecessary. It has been found desirable, however, to provide such a conductance adjustment network for use in measuring capacity unbalances between very long cable circuits, such, for example, as submarine cable circuits, in order to insure greater accuracy of measurement. Fig. 3 shows the combination of the circuits shown in Figs. 1 and 2. In Fig. 3, the capacities and the conductances existing between conductor 3 and conductors 1 and 2 and also the halves 4 and 5 of the remainder of the group of conductors are represented by dotted lines, for the reason that these capacities and conductances are parts of the circuit to be tested. The variable condensers A and B and the variable resistances A' and B' are represented by solid lines since these form part of the testing apparatus. In order to facilitate the interchanging and the interconnecting of conductors 1 and 2 with the halves of the group of conductors, a switch 6 has been provided.

Having in mind the foregoing description of the circuit arrangement in which this invention is embodied, the invention will be apparent from the following description of the method of making a direct capacity difference measurement. Let us first consider the method for measuring the direct capacity difference between two cable conductors and a third conductor. As stated heretofore, the direct conductance difference in cable circuits is relatively small, and consequently may be neglected in measuring the direct capacity difference of such conductors. Let it be assumed that we desire to measure the difference in direct capacity between the conductor 1 and conductor 3, and between the conductor 2 and conductor 3,—that is to say,—the quantity $C_a - C_b$. A difference of potential is applied by the source O between the junction point of the ratio arms R and R' and conductor 3. With condenser B in its balanced or "zero" position, the network is balanced by varying the position of the movable plates of condenser A until a balanced condition is indicated by a minimum tone or by silence in the telephone receiver. The position of the movable plates of condenser A, shown in Fig. 1, indicates that we have added capacity to the side of the network represented by the capacities $C_a$ and $C_f$, and that we have subtracted capacity from the side represented by the capacities $C_b$ and $C_e$. As is well known to those familiar with adjustable plate condensers, the reading of the scale is usually the capacity difference caused by the movement of the movable plates. In this case it is more convenient to arrange the scale to read one-half this difference. Consequently, when the bridged network is balanced, the relation of the various factors is represented by the equation $$C_a + C_f + C_1 + c_1 = C_b + C_e + C_1 - c_1 \quad (1)$$

in which $C_1$ represents the reading of the adjustable condenser A when the balanced condition exists.

The conductors 1 and 2 are now interchanged in position, so that condenser $C_a$ will occupy the position of condenser $C_b$ in the figure and similarly, condenser $C_b$ occupies the position of condenser $C_a$. The adjustable condenser A is allowed to remain in the position in which balance was obtained. Now when a difference of potential is established by the source O between the junction point of the arms R and R' and conductor 3, condenser B is adjusted until another balanced condition is established in the network, which will be indicated by silence in the telephone receiver. When this condition is reached, the relation is represented by the equation $$C_b+C_t+C_1+c_1+C_2+c_2= C_a+C_e+C_1-c_1+C_2-c_2 \quad (2)$$

Substituting in Equation (2) the value of $2c_1$ given by Equation (1), we have $$C_a-C_b=c_2 \quad (3)$$

That is to say, the setting of condenser B, when a balanced condition is established in the network, indicated the direct capacity difference between conductor 1 and 3, and conductor 2 and 3.

In the measurement of direct capacity difference between two conductors of open wire circuits and a third conductor in which the direct conductance difference is apt to be relatively large, it is necessary to balance the bridge network for such conductance difference in order to measure accurately the capacity difference. This conductance balancing is done by means of the network shown in Fig. 2. In effecting a balance under this condition, condenser A is manipulated in conjunction with the variable resistance A' and condenser B in conjunction with the variable resistance B',—that is to say—condenser A is varied until the minimum tone is produced by the telephone receiver, and then the variable resistance A' is adjusted so as to reduce the tone produced by the telephone receiver, thereby establishing a second minimum point. Further adjustment of the condenser A is then made, and likewise further adjustment of the variable resistance A'. By alternately adjusting the condenser and the resistance, the point of balance of both the conductance and the capacity networks will be reached. When this condition exists, the capacity balance will be represented by Equation (1) above, and the conductance balance will be represented by $$G_a+G_t+\frac{1}{R_1-r_1}=G_b+G_e+\frac{1}{R_1+r_1} \quad (4)$$

Conductors 1 and 2 are then interchanged in position, in the manner heretofore described, and the adjustable condenser B and the variable resistance B' are alternately adjusted until a balanced condition is reached, as indicated by silence or minimum tone in the telephone receiver. When this condition exists, the direct capacity difference will be represented by Equation (2) above, and the conductance difference will be represented by $$G_b+G_t+\frac{1}{R_1-r_1}+\frac{1}{R_2-r_2}= G_a+G_e+\frac{1}{R_1+r_1}+\frac{1}{R_2+r_2} \quad (5)$$

Substituting in Equation (5) the value of $G_t$ given by Equation (4), we obtain $$G_a-G_b=\frac{r_2}{R_2^2-r_2^2} \quad (6)$$

i. e.

$$G_a-G_b=\left(\frac{1}{R_2^2}\right)r_2, \text{ if } \frac{r_2}{R_2} \text{ is small} \quad (7)$$

It will, therefore, be apparent that by means of the networks shown in Figs. 1 and 2, it is practicable to measure direct capacity and conductance differences existing between any two conductors and third conductor or groups of conductors from which the magnitude of the direct admittance may be readily computed.

In the foregoing description and in the drawing we have set forth the method of measuring the direct capacity difference or the direct conductance difference of two conductors to a third conductor or group of conductors, which is the general case. If it is desired to make similar measurements of two conductors and ground, the ground connection is removed from group 4 and connected to point 3, and the conductor which formerly occupied position 3 is put in either group 4 or 5. The same procedure is then followed in making the measurements to ground as was pursued in measuring the various differences between two conductors and a third conductor.

This invention is furthermore adapted to measure either the direct capacity between two conductors, or between a conductor and ground; and, also, the direct conductance between two conductors or between a conductor and ground. Thus, for example, suppose it is desired to measure the direct capacity $C_a$ between conductor 1 and conductor 3. Conductor 2 would then be included in group 4, and the capacity $C_b$ would then be merged in the capacity $C_e$ of group 4 to conductor 3. Group 4 would be conductively connected with the point 2 of the bridge network, and also grounded as shown in Fig. 1. The bridge would then be balanced by adjusting condenser A and the relations would be represented by $$C_a+C_t+C_1+c_1=C_e+C_1-c_1 \quad (8)$$

Conductor 1 is shifted to point 2 of the bridge and is conductively connected to the group 4. Group 5 is conductively connected to point 1 of the bridge network. With condenser A left in the same position in which balance was previously obtained, condenser B is adjusted until a balance is obtained for the new arrangement of the conductors. When this condition is obtained the relation is represented by $$C_t+C_1+c_1+C_2+c_2= C_a+C_e+C_1-c_1+C_2-c_2 \quad (9)$$

Substituting in Equation (9) the value of $c_2$ obtained from Equation (8) and we find that $$C_a = c_2 \quad\quad\quad (10)$$

which means that the reading of condenser B, when balance is obtained is the direct capacity between conductor 1 and conductor 3. The direct conductance between conductors 1 and 3 may be measured by the network of Fig. 2, modified in the same manner as was the network of Fig. 1 to make the direct capacity measurement between the same two conductors.

In making the direct capacity and the direct conductance measurements between conductor 1 and ground, point 3 of the network is grounded and the ground is removed from group 4. The conductor shown at 3 would be included in either group 4 or 5.

In order to facilitate the operation of a bridge embodying the principle of this invention, suitable switching means would of course be provided to change the relative positions of conductors 1 and 2 with respect to the arms of the bridge, which operation has been fully described. The switching means for the capacity measuring circuit is shown schematically in Fig. 3. With the switch 6 in the position shown conductor 1 is connected with the arm R, with which the group 5 also is connected. And, similarly, conductor 2 is connected with the arm R' with which the group 4 is connected. By throwing the switch upwards the positions of conductors 1 and 2 will be interchanged and they will be interconnected, that is, 1 will be connected with R' and 2 with R, the groups of conductors 4 and 5 remaining permanently connected with the arms R' and R.

Although this invention has been described as embodied in a particular form and arrangement of parts, it is to be understood that it is capable of embodiment in other forms and arrangements without departing from the spirit and scope of the appended claims.

What is claimed is:

1. In an electrical measuring system the combination with two conductors of a third conductor having direct capacity to each of said two conductors, two groups of conductors each connected with one of said two conductors and having direct capacity to said third conductor, an adjustable condenser differentially connected between said third conductor and said groups, a second adjustable condenser differentially connected between said third conductor and said two conductors, ratio arms bridged across said two conductors, and a source of testing voltage connected between the said ratio arms and the said third conductor.

2. In an electrical measuring system the combination with two conductors of a third conductor, two groups of conductors each connected with one of said two conductors, a variable resistance connected differentially between said third conductor and said two conductors, and a second variable resistance differentially connected between said third conductor and said groups of conductors, ratio arms bridged across said two conductors, and a source of testing voltage connected between said ratio arms and said third conductor.

3. In an electrical measuring system the combination with a direct capacity difference measuring bridge of a direct conductance difference measuring bridge.

4. In an electrical measuring system for determining the direct capacity difference between two conductors of a system and a third conductor, the combination of two capacities constituting two arms of a Wheatstone bridge, two other capacities symmetrically disposed with respect to the said first capacities and connected in parallel therewith, balanced resistances constituting the other two arms of the said bridge, a source of testing potential connected between midpoints of the resistance arms and the midpoint of the capacity arms, an indicating device connected between the junction points of the said resistance arms with the said capacity arms, a variable capacity differentially connected in parallel with the said first two capacities whereby their difference in magnitude may be balanced, and a second variable capacity differentially connected in parallel with the said second two capacities whereby their difference in magnitude may be balanced.

5. In an electrical measuring system for determining the direct capacity difference between two conductors of a system and a third conductor, the combination of two condensers constituting two arms of a Wheatstone bridge, two other condensers symmetrically disposed with respect to the said first two condensers and connected in parallel therewith, balanced resistances constituting the other two arms of the said bridge, a source of testing potential connected across two opposite corners of the said bridge, an indicating device connected across the other two opposite corners of the said bridge, a variable condenser connected differentially in parallel with the said first two condensers, switching means to interchange in position the said two conductors, and a second variable condenser connected differentially in parallel with the said other two condensers.

6. In an electrical measuring system for determining the direct capacity difference between two conductors of a system and a third conductor, the combination of two balanced ratio arms, a third arm consisting of a condenser, a fourth arm consisting of a second condenser, a third condenser individual to and in parallel with one of the said capacity arms, a fourth condenser individual to and in parallel with the other of said capacity arms, a variable condenser differentially connected in parallel with the said first two condensers, a second variable condenser differentially connected in parallel with the said last two condensers, a source of testing potential and means to indicate when the said bridge is in balanced condition.

7. A Wheatstone bridge network for measuring the difference between the direct capacities to ground of two of a group of conductors, comprising two ratio arms, the inner ends of which are joined to constitute one corner of the said bridge and each outer end is connected with one of the said two conductors and also with one-half of the remainder of the said group of conductors to constitute second and third corners of the said bridge, of which the ground is the fourth corner, a variable condenser connected differentially between the said two conductors and ground, a second variable condenser connected differentially between the said halves of the said group of conductors and ground, a source of alternating potential connected between one pair of opposite corners of the said bridge, and a current indicating instrument connected across the other pair of opposite corners.

8. A Wheatstone bridge network for measuring the difference between the direct capacity of two of a group of conductors to a third conductor, comprising two ratio arms, the inner ends of which are joined to constitute one corner of the said bridge and each outer end is connected with one of the said two conductors and also with one-half of the remainder of the said group of conductors to constitute second and third corners of the said bridge of which the said third conductor is the fourth corner, a variable condenser connected differentially between the said two conductors and the said third conductor, a second variable condenser connected differentially between said halves of the said group of conductors and the said third conductor, a source of alternating potential connected between one pair of opposite corners of the said bridge, a current indicating instrument connected across the other pair of opposite corners.

9. A Wheatstone bridge network for measuring the difference between the direct capacities and the direct conductances of two of a group of conductors to a third conductor, comprising two ratio arms, the inner ends being joined to constitute one corner of the said bridge, and each outer end being connected with one of the said two conductors, and also with one-half of the remainder of the said group of conductors to constitute second and third corners of the said bridge, of which the said third conductor is the fourth corner, a variable condenser and a variable resistance, each connected differentially between the said two conductors and the said third conductor, a second variable condenser and a second variable resistance, each connected differentially between the said halves of the said group of conductors and the said third conductor, a source of alternating potential connected between one pair of opposite corners of the said bridge, and a current indicating instrument connected across the other pair of corners.

In testimony whereof, I have signed my name to this specification this 3rd day of January, 1922.

GEORGE A. CAMPBELL.